July 18, 1950     A. J. QUINN     2,515,837
DECK-ACCESS BOX
Filed March 28, 1946     3 Sheets-Sheet 1
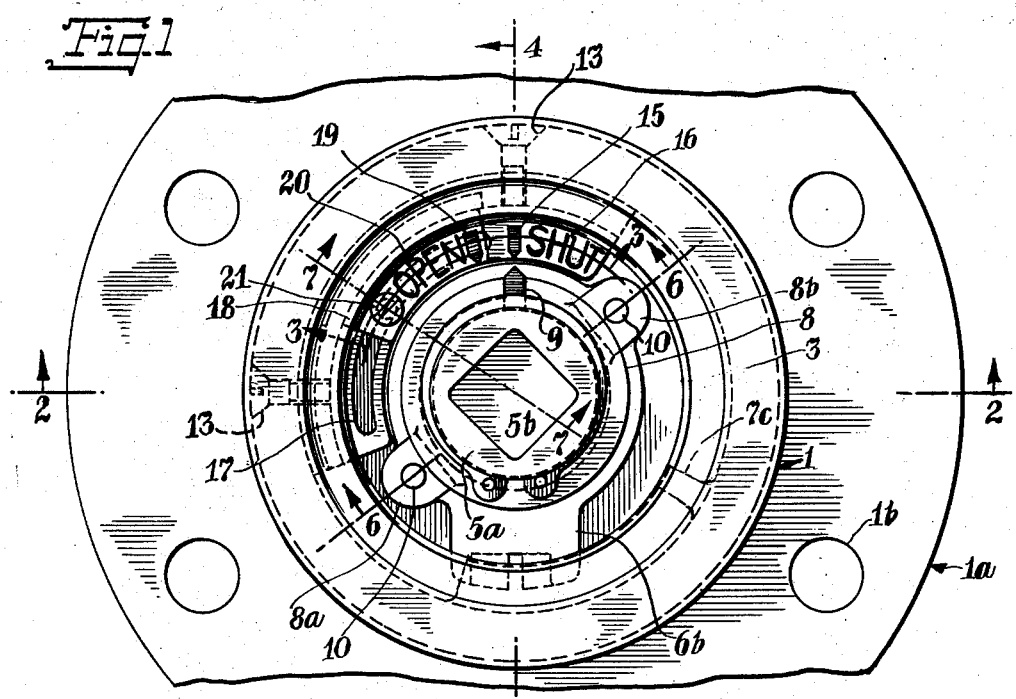
INVENTOR
ALOYSIUS J. QUINN
BY Joseph F. O'Brien
ATTORNEY July 18, 1950 A. J. QUINN 2,515,837
DECK-ACCESS BOX
Filed March 28, 1946 3 Sheets-Sheet 2
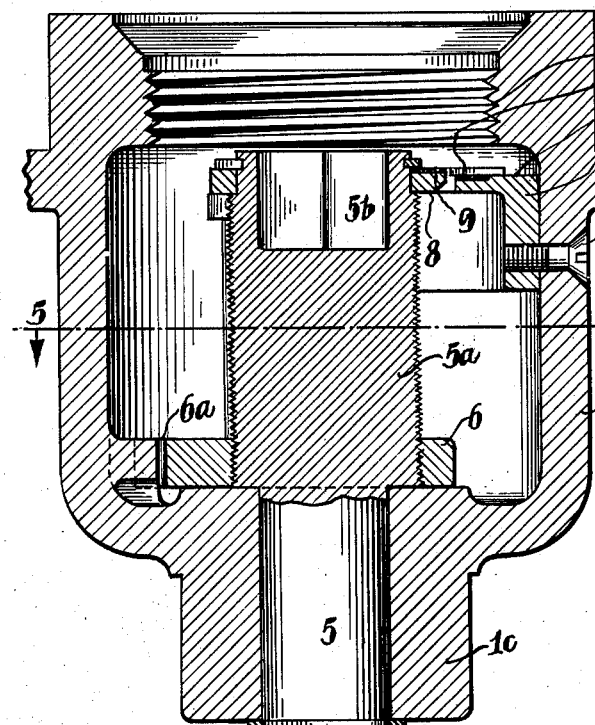
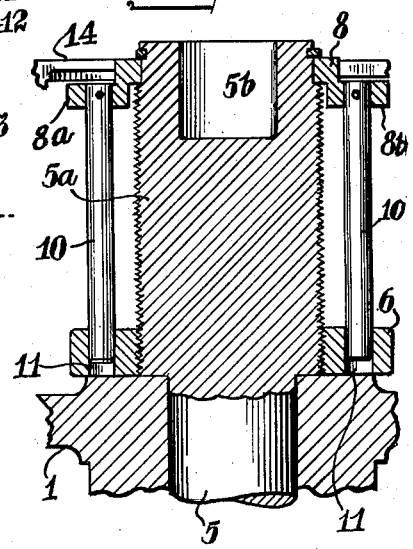
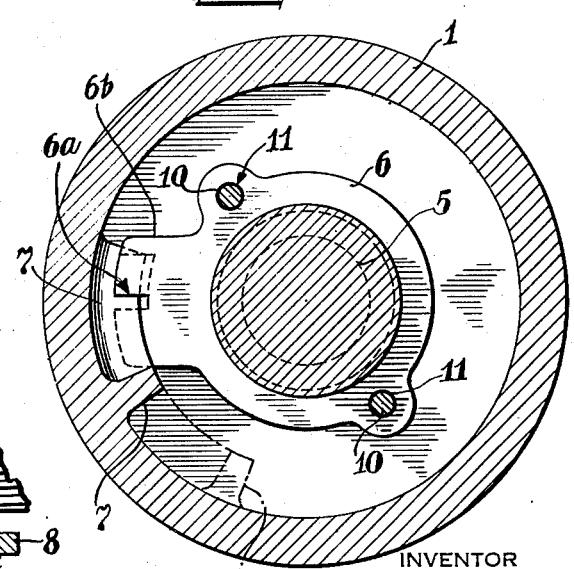
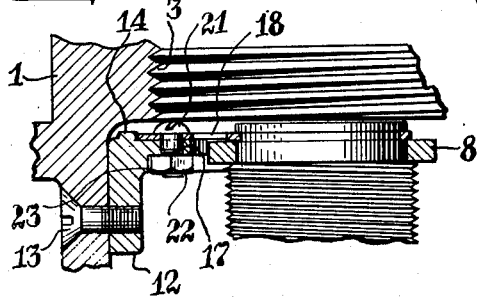
INVENTOR
ALOYSIUS J. QUINN
BY
Joseph F. O'Brien
ATTORNEY

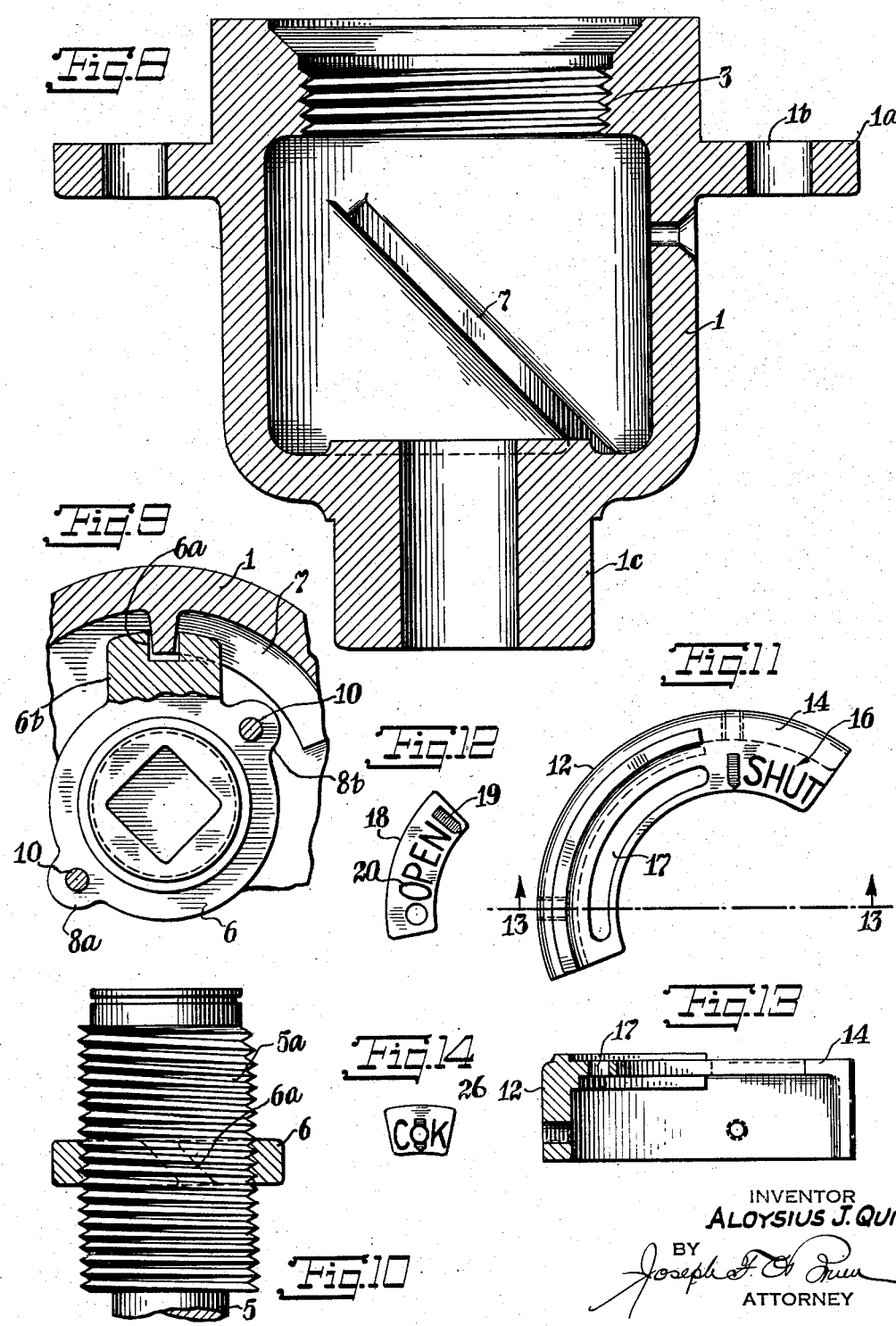

Patented July 18, 1950

2,515,837

UNITED STATES PATENT OFFICE 2,515,837

DECK-ACCESS BOX

Aloysius J. Quinn, North Bergen, N. J.

Application March 28, 1946, Serial No. 657,876

7 Claims. (Cl. 116—125)

This invention relates to improvements in deck-access boxes.

Standard prior art deck-access boxes for single valves include a casing extending downwardly through a circular opening in a deck and having rotatably mounted therein a vertically-disposed spindle adapted to be connected to a valve operating rod or flexible shafting for the purpose of rotating such rod in opposite directions to open or close a remote valve or, the like, and said spindle is provided at its upper end with an upstanding screw-threaded boss or operating member having mounted thereon a non-rotating nut having one edge engaged by and held against rotary movement and controlled by a rib or feather arranged in a vertical plane, so that upon rotation of the spindle the threads of said boss will cause said nut to have a vertical movement up and down on said screw-threaded boss or operating member, and the vertical position of said nut on the screw-threaded member will be proportionate with the turning of the spindle and the consequent open and shut positions of the connected valve. Said vertically moving nut is thus moved to the top of the screw-threaded boss when the spindle is rotated in one direction to move the valve into full open position and is moved to the bottom of the box when the spindle is rotated in the opposite direction to move the valve into closed position. A pair of indicator-label plates are employed in combination with the said nut and rib to indicate the open and shut positions of the valve, one of these plates containing the word "shut" being disposed on one side of said controlling rib and the other containing the word "open" disposed on the opposite side thereof. Such labels are usually mounted on the wall of the casing at levels adjacent to the positions of the nut assumed when the valve controlled thereby is open or shut and, consequently, one of such labels is usually positioned adjacent to the bottom of the box while the other indicator label plate is positioned at a higher plane near the top of the box and the "shut" and "open" positions of the valve are thus determined by the vertical position of the nut in relation to said label plates.

Other prior art deck-access boxes embody, in addition to the standard spindle and screw-threaded boss, a system of levers mounted in an unsymmetrical position offset from the valve-operating spindle and movable by the nut on a similar threaded boss, and this system of levers is operated by the vertical movement of the nut to swing an arm in a vertical plane and to reciprocate a pointer beneath a slotted indicating plate located in fixed position at the top of the box. The reciprocating pointer is visible through a slot in said indicator plate and is arranged to be responsive to the position of the nut on the threaded boss of the spindle and consequently to indicate the open and shut positions of the valve connected to the spindle.

One of the objects of this invention is to provide a deck box, preferably of standard shape, and having mounted therein a conventional vertically-disposed and rotatably supported spindle adapted to be connected at its lower end with a valve to be opened and closed, and provided at its upper end within the box with an upstanding screw-threaded boss or operating member having mounted thereon a nut. The movement of this nut, however, is so controlled that, upon rotation of the spindle through said boss, it will have a combined, conjoint or compound movement in both arcuate and vertical paths, thus moving upwardly and downwardly on the threads of the boss and at the same time having a slight but proportionate arcuate movement about the axis of the spindle.

Another object of my invention is to provide simple controlling means adapted to combine said two movements and to guide a given point on said nut to move in a substantially inclined direction and thus to cause a movement thereof in said combined arcuate and vertical paths and, consequently, to cause the said given point on the nut not only to move vertically but also to move horizontally in an arcuate path.

Another object of my invention is to utilize said arcuate movement which, as aforesaid, is proportional to the up and down vertical movement of the nut, to provide a gauge for determining the vertical position of the nut on the threads of the boss, and, consequently, to determine the open, shut and intermediate positions of the closing member of the valve connected to the spindle.

Another object of my invention is to utilize for the combined proportional arcuate and vertical movement a cam, and preferably a helical cam or rib, which is preferably mounted on the casing and projects into engagement with a slot in the edge of the nut, but instead of controlling a point at the edge thereof to move in a vertical path only will have a pitch or inclination to cause said nut to have a compound vertical and arcuate movement in which, as aforesaid, the arcuate movement will be proportional to the vertical movement thereof.

Still another object of my invention is to provide, in combination with a nut controlled by a helical cam or rib of the type hereinabove specified, transmission means preferably arranged coaxially with said boss and spindle, adapted to transmit from the nut to a horizontal plate at the top of the access box the said proportionate arcuate movement of said nut and to combine with said plate a pointer which is thus movable in an arcuate path at the top of the access box. I am thus enabled to provide a pointer movable in an arcuate path in a single horizontal plane at the top of the access box, and as said arcuate movement will be proportional to the vertical movement of the nut, it will, at the top of the box, indicate the vertical position of the nut on the threads of the boss, and, consequently, will accurately indicate the open, shut and intermediate position of the closing member of the valve.

Another object of my invention is to provide, in combination with an arcuately movable pointer, a pair of indicator-label plates adapted to indicate the open and shut positions of the valve, and preferably at one limit of such arcuate movement to provide a fixed label-plate adapted to indicate definitely the set closed position of the valve while another label-plate is provided with adjustable mounting means to enable an adjusting movement of said plate in relation to the fixed label-plate, so that on a movement of the valve to closed position (which is preferably verified by examination at location of the valve) the access box may be installed with the shut position accurately shown by the pointer and "shut" label plate. The valve is "shut" at this time. Upon opening of the valve to its full opening position accurate indication may be obtained by a mere sliding of the open label into registration with the travelling arrow on the arcuately travelling plate.

Another object of my invention is to provide an access box construction in which the travelling pointer is not only clearly visible at the top of the box but the indicator labels are also clearly visible and the pointer and said plate will accurately indicate the "shut," "open" and intermediate positions of the valve.

Another object of my invention is to provide an access box construction which is so simple to install and to adjust that I am enabled to reduce the time necessary for installation of the box to a fraction of the time heretofore required for the installation of standard access boxes and to avoid a considerable proportion of the labor required to adjust the labels of such standard boxes to the required positions.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a deck-access box embodying my invention;

Fig. 2 is a vertical section on the line 2—2 of Fig. 1 looking in the direction of the arrows;

Fig. 3 is a fragmentary vertical section substantially on the line 3—3 of Fig. 1;

Fig. 4 is a vertical section on the line 4—4 of Fig. 1 looking in the direction of the arrows;

Fig. 5 is a horizontal section on the line 5—5 of Fig. 4, looking in the direction of the arrows;

Fig. 6 is a fragmentary vertical section on the line 6—6 of Fig. 1 showing the spindle-boss, nut and means for transmitting the arcuate movement of the nut to the top of the access box;

Fig. 7 is a fragmentary view in vertical section on the line 7—7 of Fig. 1;

Fig. 8 is a vertical section of the casing with the spindle and its boss removed and showing the portion of the internal wall of the casing on which the cam for controlling the movement of the nut is mounted;

Fig. 9 is a view partly in fragmentary section and partly in plan showing the connection between the nut and controlling cam;

Fig. 10 is a view partly in elevation and partly in section showing a coarsely-threaded boss of the spindle removed from the casing and the nut in section thereon;

Fig. 11 is a view in plan of my indicator-label bracket with my adjustable indicator-label plate removed;

Fig. 12 is a plan view of my adjustable indicator-label plate;

Fig. 13 is a section on the line 13—13 of Fig. 12 looking in the direction of the arrows; and Fig. 14 is a view in plan of an additional adjustable indicator-label plate adapted for use on said bracket to indicate a checked position of the valve.

Referring now to these drawings, which illustrate a preferred embodiment of my invention, I indicates a cylindrical casing of my deck-access box adapted to be mounted and fastened to the deck 2 of a vessel. The casing I has, as shown, flanges $I^a$ provided with bolt-holes $I^b$ for bolting the casing to the deck, and has an annular access opening 3 provided with screw-threaded walls for engagement with screw-threads of a suitable closure plate 4. Said casing is provided at its lower end with a bearing $I^c$ for a spindle 5 having at its upper end and projecting upwardly and vertically within the casing a screw-threaded operating member or boss $5^a$ having at its upper end a squared depression $5^b$ for application of a wrench to turn the spindle 5, which is suitably connected at its lower end with a valve rod 24 or a flexible shafting (not shown) and which is adapted to be rotated when the deck-box spindle is turned to open and close a valve or like member below deck.

In devices of this character it is highly desirable (1) to provide for accurate indication of the position of the valve or like device controlled from the access box, (2) to provide for clear and unobstructed vision of the mechanism for indicating the positions of the valve; (3) to provide clear and unobstructed visibilty by locating the indicating mechanism at the top of the box; (4) to provide for adjustment of one label-plate in relation to another and preferably to provide for adjustment of an "open" label plate in relation to a fixed "shut" label plate, whereby adjustment of the "shut" position may be fixed and checked at the time of installation and adjustment of the "open" label plate may be readily made after installation of the deck box and after hook up of the spindle with the valve rod, flexible shafting or the like, thus assuring indication of the "open" and "shut" positions of a valve or the like to be indicated and providing a simple procedure of installation, and (5) to provide a pointer or arrow movable about the axis of the spindle to an indicated "shut" position, whereupon the deck box may be installed, the spindle may be connected with the valve operating rod or flexible shafting and thereafter the valve may be opened from the deck-box location and the adjustable "open" indicator-label may be adjusted and positioned at the point indicated by the pointer or arrow on the spindle, thus saving installation time and costs.

In accordance with this invention, a nut 6 is mounted in conventional manner on the boss 5 with its internal threads in mesh with the external threads of said boss 5 but, instead of being restrained and moved in a vertical path by the screw-threads of the boss upon rotation thereof, I provide means for positively guiding the movement of said nut by said threads in a compound vertical and arcuate movement in which the arcuate movement will be proportionate in extent to the vertical movement and the number of rotations of the spindle. To this end, I utilize a helical or inclined cam 7 preferably comprising a rib which is integrally cast on the wall of a box 1 and provide a sliding connection between said rib and nut. Said helical cam or rib 7 has a pitch that will enable a given degree of arcuate movement and avoid jamming. I have found that a pitch of approximately 44 degrees is desirable in order to prevent jamming and to permit a ready upward sliding of a section of the nut on the rib 7. As shown, a slot or groove 6ª is formed in a radial projection 6ᵇ on the nut which extends toward the wall of the casing to permit engagement of the grooved portion 6ª with the projecting edge of the rib 7. The pitch of this rib is proportionate to the extent of such vertical movement. The vertical movement of the nut is, of course, proportional to the number of turns of the boss and the pitch of the engaged threads. Such a connection of the nut 6 and rib 7 gives the nut a compound movement comprising a vertical movement up or down on the boss and an arcuate movement extending for a suitable distance around the axis of the spindle, and, in accordance with my invention, I utilize said arcuate proportional movement of the nut to indicate the vertical position of the nut in relation to the boss and, consequently, to indicate the position of a valve connected to the spindle.

In the preferred embodiment of my invention I transmit said arcuate movement by transmission mechanism to the top of the box in order to procure increased visibility of the said plate, and to this end preferably mount on the upper unthreaded top portion of the spindle 5, a plate 8 rotatable in a horizontal plane and provide said plate with a pointer 9 to enable ready following of said arcuate movement of the plate and nut. As illustrated, said plate 8 is provided with wing portions 8ª—8ᵇ in which are fixedly mounted vertical rods 10—10 extending downwardly and having at their lower ends vertically slidable connections with the nut 6. As shown, said rods 10—10 pass through vertical apertures 11—11 in the nut 6. Obviously, when the nut 6 is moved by the screw-threads of the boss 5ª upon rotation thereof, the vertical rods 10 will transmit only the arcuate movement of the nut 6 to the plate 8. The pointer 9 on said plate will, owing to the fact that the arcuate movement of the plate and nut is in proportion to the vertical movement thereof, provide a readily visible means to accurately indicate the vertical position of the nut and positions from "open" to "shut" of the valve connected to the spindle 5.

In said preferred embodiment of my invention illustrated, I preferably combine with the pointer 9 label-indicator plates on the casing. These label-indicator plates are positioned and arranged to cooperate with said pointer to determine and to indicate more accurately and visibly the position of the valve and particularly the "open" and "shut" positions thereof.

In the instant application of my invention, I preferably utilize a fixed indicator-label plate having an indication showing a "shut" position of the valve and utilize in combination therewith an adjustable label-indicator plate adapted, upon adjustment, to accurately indicate the "open" position of the valve.

In the embodiment illustrated, I provide at the top of the casing 1 a label-indicator bracket 12 of arcuate conformation which is fastened to the internal surface of the wall of the casing 1 by screws 13. This bracket 12 has a horizontally disposed table or plate 14 on which at one end is shown an arrow 15 and the word "shut" 16. These indications are preferably stationarily arranged on the horizontal table or plate 14, and the arcuate table portion 14 of said bracket is provided with an arcuate slot 17 adapted to permit adjustment therein of an adjustable label-indicator plate 18, which is provided with an arrow 19 and the word "open" 20. As illustrated, the plate 18 is provided with a screw passing through the slot 17 and provided below the slot 17 with faceted nut 22 arranged adjacent to a downwardly-extending flange 23 and said nut 22 is prevented from turning by having one of its facets engageable with said flange 23 so that the screw 21 will be capable of loosening and tightening adjustment by a mere turning thereof through application of a screw driver to a kerf on the upper surface of the screw 21. This construction permits an adjusting movement of the adjustable indicator plate to any suitable given arcuate degree. I preferably burr over the last thread on the screw so that the nut cannot be removed therefrom.

In accordance with my invention, the label-indicator bracket 12 is arranged in fixed position on the casing 1, and I install the access-box by the following procedure: (1) I close at its location below deck the valve to be controlled by the access-box; (2) I turn the spindle 5 and its boss 4 until the arrow 9 comes opposite to the arrow 15 adjacent to the word "shut." The deck-access box in then installed and I connect the spindle 5 with a valve operating rod 24 by a connection 25, as shown in Fig. 4, or as an alternative make suitable connection of said spindle with a flexible shaft. I then open the valve from the deck-access location and by the use of a screw driver adjust the open label and its arrow to the proper indication shown by the arrow 9 in the full open or opposite extreme position. Under such conditions, I am enabled to procure accurate indication of the "open" and "shut" positions of the valve and also to indicate any intermediate positions thereof, which may be indicated by an additional label, such as the "CK" label 26 shown in Fig. 14, in cases where it is desirable to indicate a "checked" position of the valve, and this is accomplished by a very simple mechanism that is not likely to get out of order, and as the movable pointer and the indicator labels are positioned at the top of the box unobstructed visibility thereof will be provided, and furthermore the time of installation of a box of this character is greatly reduced and minimized.

Having described my invention, I claim:

1. A deck-access box embodying, in combination, a casing, a spindle rotatably mounted therein and connective with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, said casing being provided with a rigid helical cam-rib having a controlling engagement with said nut and operable upon rotation of said boss to cause simultaneous movements of said nut along said threaded boss in a path parallel with its axis and in an arcuate path about said axis, said arcuate movement being proportionate in extent to said vertical movement, and means having plural indicating portions adjustable in relation to each other for visibly indicating said arcuate movement to show open and closed positions of the connected valve.

2. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately-movable plate mounted at the upper end of said access box, means for transmitting the arcuate movement of said nut to said plate, and adjustable indicating means on said plate for indicating positions of a valve connected with said spindle.

3. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately-movable plate mounted on said spindle at the upper end of said access box, means for transmitting the arcuate movement of said nut to said plate, indicating means on said plate, and adjustable indicating means on the casing to visibly indicate the positions of a valve connected with said spindle.

4. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately movable plate mounted on said spindle at the upper end of said access box, means for transmitting the arcuate movement of said nut to said plate, indicating means on said plate, and indicating means on the casing comprising a pair of indicator-label plates, one of which is adjustably movable in relation to the other.

5. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately movable plate mounted at the upper end of said access box, means for transmitting the arcuate movement of said nut to said plate, and indicating means comprising a label bracket fixedly mounted on the casing, provided at one end with indicating characters to indicate closed position of the valve and a second indicator-label plate mounted on said bracket and movable in relation to said first mentioned indicator characters.

6. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw-threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately movable plate mounted on said spindle at the upper end of said access box, means for transmitting the arcuate movement of said nut to said plate, indicating means on said arcuately-movable plate, and indicating means on the casing comprising an indicator-label bracket fixedly mounted on the casing, provided at one end with fixed indicating characters to indicate closed position of a valve connected with said spindle, said bracket being provided with an arcuate slot and a second label-indicating plate being adjustably mounted in said arcuate slot.

7. A deck-access box embodying, in combination, a casing, a spindle rotatably mounted therein and adapted to be connected with a valve-operating member and valve, mechanism for indicating the opening and closing movements of a connected valve comprising an upstanding screw-threaded boss at the upper end of said spindle, means for rotating said boss, a screw-threaded nut engaging the screw threads of said boss, means engageable with said nut and operable upon rotation of said boss to cause simultaneous movements of said nut along said threaded boss in a path parallel with its axis and in an arcuate path about said axis, said arcuate movement being proportionate in extent to said vertical movement, an arcuately movable plate mounted at the upper end of said access box and transmission mechanism for transmitting the arcuate movement of said nut to said arcuately-movable plate comprising a pair of vertical rods connected at their upper ends to the said arcuately movable plate and having at their lower ends a vertical sliding engagement with said nut.

ALOYSIUS J. QUINN.

REFERENCES CITED

The following references are of record in the file of this patent:

UNITED STATES PATENTS

| Number | Name | Date |
|---|---|---|
| 819,185 | Vincent | May 1, 1906 |
| 2,175,129 | Rolfson | Oct. 3, 1939 |
| 2,379,517 | Hadden | July 3, 1945 |

FOREIGN PATENTS

| Number | Country | Date |
|---|---|---|
| 6,835 | Great Britain | Apr. 3, 1895 |